(12) United States Patent
Ganong, III et al.

(10) Patent No.: US 9,032,219 B2
(45) Date of Patent: May 12, 2015

(54) SECURING SPEECH RECOGNITION DATA

(71) Applicant: Nuance Communications, Inc., Burlington, MA (US)

(72) Inventors: William F. Ganong, III, Brookline, MA (US); Maximilian Bisani, Arlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 173 days.

(21) Appl. No.: 13/679,657

(22) Filed: Nov. 16, 2012

(65) Prior Publication Data

US 2014/0143550 A1 May 22, 2014

(51) Int. Cl.
| | | |
|---|---|---|
| G06F 21/00 | (2013.01) | |
| G06F 21/32 | (2013.01) | |
| G06F 21/60 | (2013.01) | |

(52) U.S. Cl.
CPC .............. G06F 21/32 (2013.01); G06F 21/606 (2013.01)

(58) Field of Classification Search
USPC ............ 713/153, 176, 150, 189, 179; 726/30; 709/217, 219
See application file for complete search history.

(56) References Cited

U.S. PATENT DOCUMENTS

| | | | | |
|---|---|---|---|---|
| 6,141,753 A * | 10/2000 | Zhao et al. | | 713/176 |
| 2003/0037250 A1 | 2/2003 | Walker et al. | | |
| 2003/0172127 A1 * | 9/2003 | Northrup et al. | | 709/219 |
| 2005/0065950 A1 * | 3/2005 | Chaganti et al. | | 707/100 |
| 2006/0136259 A1 * | 6/2006 | Weiner et al. | | 705/2 |
| 2007/0118399 A1 * | 5/2007 | Avinash et al. | | 705/2 |
| 2008/0086305 A1 | 4/2008 | Lewis et al. | | |
| 2008/0209222 A1 * | 8/2008 | Narayanaswami et al. | | 713/184 |
| 2009/0132803 A1 * | 5/2009 | Leonard et al. | | 713/150 |
| 2010/0281254 A1 * | 11/2010 | Carro et al. | | 713/162 |
| 2011/0022835 A1 * | 1/2011 | Schibuk | | 713/153 |
| 2011/0131138 A1 | 6/2011 | Tsuchiya | | |
| 2011/0197159 A1 * | 8/2011 | Chaganti et al. | | 715/781 |
| 2012/0010887 A1 * | 1/2012 | Boregowda et al. | | 704/250 |
| 2012/0095923 A1 * | 4/2012 | Herlitz | | 705/51 |
| 2012/0166186 A1 * | 6/2012 | Acero et al. | | 704/205 |
| 2013/0073672 A1 * | 3/2013 | Ayed | | 709/217 |
| 2013/0104251 A1 * | 4/2013 | Moore et al. | | 726/30 |
| 2013/0262873 A1 | 10/2013 | Read et al. | | |
| 2014/0143533 A1 | 5/2014 | Ganong, III et al. | | |

* cited by examiner

*Primary Examiner* — Thu Ha Nguyen

(74) *Attorney, Agent, or Firm* — Wolf, Greenfield & Sacks, P.C.

(57) ABSTRACT

Methods and apparatus for reducing security vulnerabilities in a client/server speech recognition system including one or more client computers and one or more server computers connected via a network. Decryption of sensitive information, such as medical dictation information, is performed on designated servers to limit the attack surface of unencrypted data. Management of encryption and decryption keys to restrict the storage and/or use of decryption keys on the server side of the client/server speech recognition system, while maintaining encrypted data on the server side is also described.

20 Claims, 7 Drawing Sheets

SECURING SPEECH RECOGNITION DATA

BACKGROUND

Client/server speech recognition systems where a client computer sends speech data to one or more server side speech recognition servers for recognition and receives a speech recognition result corresponding to the speech data in return have become more common in recent years. Such systems allow speech recognition operations to be performed on speech data from computers that need not have capabilities locally to perform automatic speech recognition.

SUMMARY

One embodiment is directed to a method, comprising: accessing, from at least one storage device, encrypted medical dictation information; decrypting, using a first decryption key, the encrypted medical dictation information to produce decrypted medical dictation information; performing, by at least one speech recognition engine, speech recognition on the decrypted medical dictation information to produce an unencrypted speech recognition result; discarding the first decryption key and the decrypted medical dictation information; and retaining the encrypted medical dictation information on the at least one storage device.

Another embodiment is directed to a server, comprising: at least one speech recognition engine; and at least one processor programmed to: access encrypted medical dictation information from at least one storage device; decrypt the encrypted medical dictation information using a first decryption key to produce decrypted medical dictation information; instruct the at least one speech engine to perform speech recognition on the decrypted medical dictation information, thereby producing an unencrypted speech recognition result; discard the first decryption key and the decrypted medical dictation information; and maintain the encrypted medical dictation information on the at least one storage device.

Another embodiment is directed to an adaptation server configured to adapt an encrypted speech recognition model, the adaptation server comprising: at least one processor programmed to: access an encrypted speech recognition result and encrypted medical dictation information from at least one storage device on which the encrypted speech recognition result and the encrypted medical dictation information are stored; receive, from a client computer a first decryption key and a second decryption key; decrypt the encrypted speech recognition result using the first decryption key to produce a decrypted speech recognition result; decrypt the encrypted medical dictation information using the second decryption key to produce decrypted medical dictation information; adapt the encrypted speech recognition model based, at least in part, on the decrypted speech recognition result and the decrypted medical dictation information; and discard the first decryption key, the second decryption key, the decrypted speech recognition result, and the decrypted medical dictation information.

Another embodiment is directed to a method, comprising: receiving, by a client computer, an encrypted speech recognition result from a speech recognition server; decrypting the encrypted speech recognition result using a decryption key to produce a decrypted speech recognition result, wherein the decryption key is stored on at least one storage device accessible to the client computer; receiving at least one user edit to the decrypted speech recognition result to produce a modified speech recognition result; encrypting the modified speech recognition result using an encryption key to produce an encrypted modified speech recognition result, wherein the encryption key is stored by the at least one storage device accessible to the client computer; and sending the encrypted modified speech recognition result to the speech recognition server.

Another embodiment is directed to a client computer, comprising: at least one processor programmed to: receive a first encrypted speech recognition result from a server computer; access at least one storage device accessible to the client computer to retrieve a decryption key and an encryption key; decrypt the first encrypted speech recognition using the decryption key to produce a decrypted speech recognition result; encrypt at least a portion of the decrypted speech recognition result using the encryption key to produce a second encrypted speech recognition result; and sending the second encrypted speech recognition information to the server computer.

Another embodiment is directed to at least one computer-readable storage medium encoded with a plurality of instructions that, when executed by a computer, perform a method comprising: receiving, by a client computer, an encrypted speech recognition result from a speech recognition server; decrypting the encrypted speech recognition result using a decryption key to produce a decrypted speech recognition result, wherein the decryption key is stored on at least one storage device accessible to the client computer; receiving at least one user edit to the decrypted speech recognition result to produce a modified speech recognition result; encrypting the modified speech recognition result using an encryption key to produce an encrypted modified speech recognition result, wherein the encryption key is stored by the at least one storage device accessible to the client computer; and sending the encrypted modified speech recognition result to the speech recognition server.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that information transferred and stored in a client/server speech recognition system may include sensitive information, such as personal health information, that may be vulnerable to malicious attacks if the information is not protected (e.g., by using encryption). For example, sensitive information transmitted to, stored by, and produced at the server side of a client/server speech recognition system may be susceptible to attack in its unencrypted state to the extent that the attacker has access to client-server communication channels and/or server side processing and/or storage on which the unencrypted sensitive information is present. To this end, some embodiments of the invention relate to limiting the "attack surface" of unencrypted sensitive information stored and processed on the server side of a client/server speech recognition system. In some embodiments, access to unencrypted sensitive information processed during server side tasks is limited by managing encryption/decryption keys in a way that reduces the risk that an attacker can decrypt sensitive data, and by controlling access to the sensitive information stored on the server computer(s) from the client computer.

Figure 1:
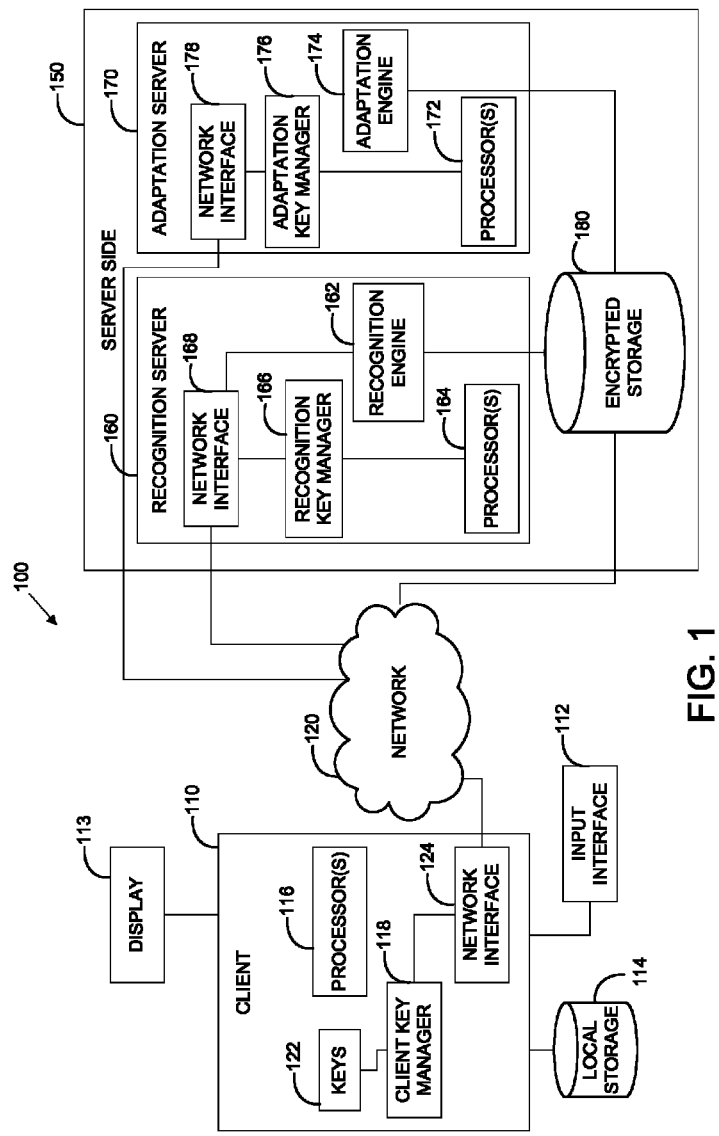
FIG. 1 is an exemplary speech recognition system on which some embodiments of the invention may be implemented.

FIG. 1 illustrates an exemplary client/server speech recognition system 100 that may be used in accordance with some embodiments of the invention. System 100 includes client computer 110 and server side computer(s) 150 connected to client computer 110 via network 120. Client computer 110 includes input interface 112 configured to receive user input including, but not limited to, speech input. For example, input interface may include a microphone that, when activated, records speech input and stores the recorded speech input in local storage 114 associated with client computer 110. Although local storage 114 is illustrated as being external to client computer 110, it should be appreciated that local storage 114 may alternatively or additionally be provided internal to client computer 110. In some embodiments, input interface 112 may include multiple input interfaces each configured to receive one or more types of user input. For example, input interface 112 may include a keyboard (e.g., a QWERTY keyboard), a keypad, a touch-sensitive screen, or any other suitable user input device. Client computer 110 also includes one or more output devices including display 113 and at least one speaker (not shown) configured to produce audio output. Applications (e.g., a medical dictation application or any other applications that may include sensitive data) executing on client computer 110 may be programmed to display a user interface thereon to facilitate the performance of one or more actions associated with the application. In one example described herein, the application receives medical dictation and displays speech recognition results for the received medical dictation. However, the aspects of techniques described herein are not limited to use with a medical dictation application, and can be used with any type of application that accepts speech input.

In some embodiments, speech input received via input interface 112 may be transmitted to the server side computer(s) 150 with no or minimal processing performed on it. In other embodiments, the speech input may be pre-processed (e.g., to extract features therefrom, for compressing purposes, etc.) to facilitate automatic speech recognition operations performed on the server side of a client/server system. In yet further embodiments, the speech input may be at least partially recognized by one or more local speech recognizers (not shown) associated with client computer 110. The techniques described herein are not limited in any respect by the manner in which the speech input is processed (or not) by the client computer 110, as the techniques described herein can be used to secure any type of speech data at the server side of a client/server speech recognition system.

Some or all of the speech input received via input interface 112 and/or any speech data derived therefrom (collectively referred to herein as "speech recognition input data") may be transferred to server side computer(s) 150 for recognition. Additional information may be transferred to server side computer(s) 150 with the speech recognition input data including, but not limited to, a speaker identity and a context in which the speech input was received. This information may be used by server side computer(s) 150 to facilitate a speech recognition of the speech recognition input data. Prior to transferring the speech recognition input data to server side computer(s) 150 for recognition, at least some of the speech recognition input data may be encrypted to improve the security of the speech recognition input data against malicious attacks. As discussed above, some speech recognition input data, such as medical dictation information, may include sensitive information (e.g., personal health information) for which protection against unauthorized access is desired. In some embodiments, client computer 110 includes one or more processors 116 programmed to perform, among other things, encryption of speech recognition input data that includes sensitive information, prior to transferring the encrypted speech recognition input data to server side computer(s) 150 for recognition.

Encryption of speech recognition input data may be performed in any suitable way using any suitable encryption algorithm(s). In some embodiments, encryption of speech recognition input data is performed using an encryption key generated by a client key manager 118 associated with client computer 110. Client key manager 118 may be configured to generate and/or manage encryption and decryption keys used to facilitate a secure transfer of speech recognition input data to server side computer(s) 150.

In one implementation, client key manager 118 may be configured to generate a pair of keys 122 including an encryption key and a decryption key. The encryption key may be used to encrypt speech recognition input data transferred to server side computer(s) 150 and the decryption key may be sent to server side computer(s) 150 separately from the encrypted speech recognition input data to allow server side computer(s) 150 to decrypt the transferred encrypted speech recognition input data.

The inventors have recognized that some potential attackers may attempt to the discover keys transferred between client computers and server computers by monitoring communications between clients and servers. For example, if a decryption key is sent between a client and a server, "in the clear" (i.e., without secure protection), there is a risk that an attacker monitoring communications between the client and server can intercept the decryption key, thereby enabling the attacker to decrypt encrypted information stored in server side storage. To address this security vulnerability, in some embodiments, one or more decryption keys transferred between client computer 110 and server side computer(s) 150 may themselves be encrypted. For example, when a client computer 110 issues a request to server side computer(s) 150 for speech recognition, a server side recognition server may generate a pair of keys, including an encryption key which is sent to the client computer 110 that issued the request, and a decryption key which the recognition server maintains. The client computer 110 may use the encryption key generated by the recognition server to encrypt the decryption key for the encrypted speech recognition input data generated by the client computer, prior to sending the decryption key to the server side computer(s) 150, as discussed above. In some embodiments, the client computer 110 may communicate directly with a recognition server that has been selected for speech recognition and may send the encrypted decryption key directly to that recognition server. The recognition server can subsequently decrypt the encrypted decryption key using the decryption key that was generated and maintained on the recognition server. Embodiments of the invention are not limited to sending a decryption key directly to the recognition server, as the recognition server can obtain the decryption key in any suitable way.

In some embodiments, the decryption key generated by client key manager 118 may be an inverse of the encryption key used to encrypt speech recognition input data sent to server side computer(s) 150. Although the keys in the pair are inverses, they may not be derivable from one another. Techniques for encrypting and decrypting information using inverse pairs of keys, often referred to as encryption with public/private key pairs, is readily understood by those of skill in the art, and thus will not be described in further detail herein.

In some embodiments where client computer 110 is configured to receive dictation speech recognition input data, client key manager 118 may generate a pairs of keys 122 for each dictation session, and these keys may be used to encrypt at least a portion of the speech recognition input data as it is received by client computer 110. The pair of keys (e.g., an encryption key and a decryption key) may be associated with the dictation session in any suitable way. For example, in one implementation metadata including a session identifier may be associated with the decryption key and/or encryption key for the session and the metadata may be stored by the client key manager 118 to identify which key(s) were used to encrypt speech recognition input data for a particular session. Alternatively, information about the keys, such as date/time information indicating when the keys were created may be used to determine which keys were used for encrypting speech recognition input data for a particular session. Any other technique for associating keys with a particular session may be used and embodiments of the invention are not limited in this respect. While a new key pair may be generated for each session in some embodiments, not all embodiments are limited in this way. For example, in some embodiments a pair of keys may be generated for each client computer, with the client computer always using the same pair of keys or each client may periodically generate a new pair of keys to use for encryption of speech recognition input data.

As discussed above, a potential security vulnerability relates to transferring unencrypted decryption keys between a client and a server. Rather than encrypting the decryption keys that are transferred between clients and servers as discussed above, in some embodiments, decryption keys are not transferred between clients and servers, but are maintained locally. For example, in one implementation, a client computer 110 may issue a request to server side computer(s) 150 to perform a speech recognition operation. In response, the server side computer(s) 150 may designate a particular recognition server 160 to perform speech recognition in response to the request. A key manager on the designated recognition server may generate a pair of keys including an encryption key which is sent to the client computer 110 that issued the request, and a corresponding decryption key which is maintained locally on the recognition server. The client computer 110 may receive the encryption key from the server side computer(s) 150 and use it rather than using a locally generated encryption key as discussed above to encrypt the speech recognition input data. The client computer 110 may then send the encrypted speech recognition input data to the designated recognition server, which may subsequently use the stored decryption key to decrypt the encrypted speech recognition input data. Avoiding the transfer of unencrypted decryption keys between clients and servers in a client/server speech recognition system ensures that such keys cannot be intercepted by monitoring communication traffic between the client and the server.

Although the embodiment described above where a server side computer provides an encryption key to client computer 110 to use for encryption of speech data avoids a potential security vulnerability associated with transferring unencrypted decryption keys in a client/server speech recognition system, the inventors have recognized that an attacker may still compromise the integrity of speech data by monitoring communications from the speech side computer generating the encryption key and substituting the generated encryption key with an encryption key generated by the attacker. The client computer 110 unaware of the substitution may use the encryption key from the attacker to encrypt speech data sent to the server side computer for recognition and the attacker monitoring client/server communications may intercept the encrypted speech data and decrypt it using a corresponding decryption key maintained by the attacker computer. In some embodiments, this possible security vulnerability is addressed by having the server side computer sign the generated encryption key using a private key identifying the server side computer. When the client computer receives the encryption key from the server side computer, the client computer can verify the encryption key using a public key for the server side computer prior to using the encryption key to encrypt speech data to send to the server side computer. By verifying the source of the encryption key prior to using the key to encrypt speech data, the client computer may detect a substituted encryption key generated by an attacker as a fraudulent key and not use such a key to encrypt speech data.

Client computer 110 may also include network interface 124 configured to enable client computer 110 to communicate with one or more server side computer(s) 150 via network 120. For example, after encrypting speech recognition input data with an encryption key, processor(s) 116 may be configured to transmit the encrypted speech recognition input data to server side computer(s) 150 using network interface 124. Network interface 124 may also receive one or more requests from server side computer(s) 150 to provide information including, but not limited to, decryption keys and encrypted speech recognition results, as discussed in further detail below.

In some embodiments, server side computer(s) 150 comprises one or more server computers configured to facilitate speech recognition in a client/server speech recognition system. In the embodiment shown in FIG. 1, server side computer(s) 150 includes a recognition server 160 configured to process speech recognition input data to produce a recognition result using a recognition engine 162. Recognition server 160 includes one or more processors 164 that control the operation of recognition server 160 to perform one or more tasks including speech recognition on speech recognition input data received from one or more client computers. Processor(s) 164 are in communication with recognition key manager 166, which is configured to generate key(s) for encryption/decryption of speech information and/or encryption keys. For example, as discussed above, recognition key manager 166 may be used to generate encryption/decryption key pairs, wherein the encryption key is sent to a client computer for encrypting speech recognition input data to be sent to the server side computer(s) 150. Recognition key manager 166 may additionally or alternatively be configured to generate keys to encrypt speech recognition results generated by recognition server 160.

In some embodiments, processor(s) 164 may be programmed to generate a request for speech recognition input data and/or decryption key information from client computer 110 and the request may be sent to client computer 110 via network 120 using network interface 168. Illustrative techniques for performing the recognition of encrypted speech recognition input data received by recognition server 160, in accordance with some embodiments, are described in further detail below. Although server side computer(s) 150 are illustrated as having only a single recognition server 160, it should be appreciated that server side computer(s) 150 may have any number of recognition servers to perform speech recognition, as the techniques described herein are not limited by the number of server side recognition servers employed by the server side of the client/server speech recognition system 100. Additionally, in some embodiments, the server(s) and associated storage device(s) included as server side computer(s) 150 may be partitioned (e.g., by a firewall) from external computers connected to server side computer(s) 150 via network 120.

Recognition server 160 processes speech recognition input data using one or more speech recognition models (not shown) to determine a speech recognition result from received speech recognition input data. Any type of automatic speech recognition may be used, as the techniques described herein are not limited to any particular automatic speech recognition techniques. For example, some recognition servers 160 may apply an acoustic model and a language model to the speech recognition input data to determine a speech recognition result. In accordance with some embodiments, adaptation techniques may be employed so that with continued use of the speech recognition system, one or more speech recognition models may be adapted to improve the speech recognition performance of recognition server 160, which uses the model(s) for speech recognition. The speech recognition model(s) used to map speech recognition input data to a speech recognition result by recognition engine 162 may be speaker agnostic, or at least one of the models may be associated with a particular speaker. By associating speech recognition model(s) with a particular speaker, speech recognition may be improved for that speaker. Furthermore, when adapting techniques are employed, performance is improved as the speech recognition system learns characteristics of the speaker's speech as feedback regarding the accuracy of speech recognition result is received from client computer(s).

To facilitate the adaptation of speech recognition models, server side computer(s) 150 may include adaptation server 170 configured to adapt speech recognition model(s) used for speech recognition by speech recognition server 160. Adaptation server 170 may include processor(s) 172 programmed to control an operation of adaptation server 170. In one implementation, processor(s) 172 may be programmed to instruct adaptation engine 174 to adapt a speech recognition model based, at least in part, on information received from client computer 110, wherein the information is related to a speech recognition result. For example, the information may describe one or more edits made to a speech recognition result by a user of client computer 110. The adaptation engine 174 may use this information to adapt a model (e.g., an acoustic or language model) to improve the speech recognition accuracy for one or more speakers associated with the model.

Adaptation server 170 may also include adaptation key manager 176 that generates and/or manages keys used to encrypt/decrypt speech recognition models used by recognition server 160 for speech recognition. The inventors have recognized that in addition to protecting sensitive speech recognition input data and recognition results, speech recognition models may also include sensitive information that may be protected by encrypting the speech recognition models when the models are not being used by server side computer(s) 150. As discussed in more detail below, when it is determined that adaptation of a speech recognition model is desired, adaptation server 170 may send a request to client computer 110 via network 120 using network interface 178. In response to receiving the request, the client computer 110 may send adaptation server 170 a decryption key to decrypt an encrypted speech recognition model.

In some embodiments, when a speech recognition model is initialized, adaptation key manager 176 may be configured to generate a pair of keys for the model, including an encryption key to encrypt the model and a decryption key that is sent to client computer 110. In some embodiments, the decryption key may itself be encrypted by an encryption key provided to the recognition server from client computer 110. By providing decryption keys for encrypted speech recognition models to client computers and not storing them on the server side, access to the encrypted speech recognition models may be limited to client computers that have the appropriate decryption keys. Thus, attackers who may gain access to server side computer(s) may be unable to decrypt encrypted speech recognition models because an appropriate decryption key is not stored on the server side of the client/server speech recognition system.

Server side computer(s) 150 may also include encrypted storage 180 configured to store encrypted speech recognition input data received from client computer 110. Encrypted storage 180 may be further configured to store encrypted speech recognition models used for speech recognition by recognition server 160 and/or which may be provided to adaptation server 170 for adaptation, as discussed above. Encrypted storage 180 may comprise one or more data stores accessible to server side computer(s) 150 and may be included as a portion of one of the server side computer(s) 150 or may be externally connected to server side computer(s) 150 using one or more network connections.

Server side computer(s) 150 may also include one or more other computers configured to manage aspects of the server side of the client/server speech recognition system. For example, server side computer(s) 150 may include a routing server that distributes incoming speech recognition jobs to available recognition servers (e.g., recognition server 160) based on a plurality of factors such as the availability of a recognition server to perform speech recognition.

In some embodiments, server side computer(s) 150 may also include a server side key manager (not shown) configured to manage one or more decryption keys for at least one client computer in the client/server speech recognition system. That is, rather than maintaining all decryption keys on the client side of the client/server speech recognition system and requesting appropriate decryption keys when needed, some embodiments may maintain at least some of the decryption keys on the server side to reduce the transfer of decryption keys across network 120 and/or to keep maintain the decryption keys in centralized storage rather than the keys being widely distributed across many clients. In embodiments where at least some decryption keys are maintained on the server side, the decryption keys may be themselves encrypted with one or more keys generated by a client or server computer in the client/server speech recognition system.

Figure 2:
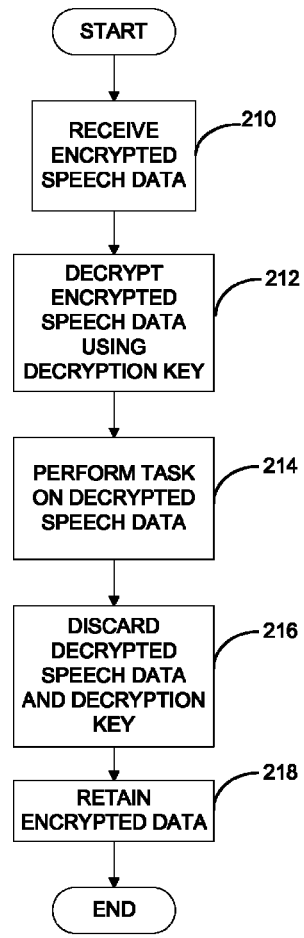
FIG. 2 is a flow chart of an exemplary process for performing a server side task on encrypted speech data in accordance with some embodiments of the invention.

FIG. 2 illustrates an exemplary process for performing a speech recognition task by a server system, in accordance with some embodiments of the invention. In act 210, encrypted speech recognition input data, such as encrypted medical dictation information, is received by a server side computer. In some embodiments, the server system may include a server that routes the encrypted speech recognition input data to a designated recognition server. In other embodiments, the encrypted speech recognition input data may be directly provided to recognition server 160 over network 120. In response to receiving the encrypted speech recognition input data, the data may be stored, for example, in encrypted storage 180. In some embodiments in which the server system does not store a decryption key for the encrypted speech recognition input data unless and until a client computer provides it, the sensitive information included in the received encrypted speech recognition input data is further protected from unauthorized access. As discussed above, all embodiments are not limited to transferring decryption keys between clients and servers, as a server system in some embodiments generates and stores decryption keys locally and only sends encryption keys to client computers for encrypting speech recognition input data.

If the encrypted speech recognition input data was received in response to a request for speech recognition, the encrypted speech recognition input data may be provided to recognition server 160 for speech recognition. Additionally, one or more speech recognition models used for speech recognition may also be provided to recognition server 160 from encrypted storage 180. The recognition server 160, upon receiving the encrypted speech recognition input data, may send a request to client computer 110 for a decryption key to decrypt the encrypted speech recognition input data. As discussed above, in some embodiments, when speech recognition input data is encrypted by client computer 110, a corresponding decryption key may also be generated by a client key manager 118 and the decryption key may be stored by client computer 110 until a request is received from server side computer(s) 150 to provide the decryption key. Accordingly, client computer 110 has control over when encrypted speech recognition input data sent to server side computer(s) 150 may be decrypted to perform a task such as recognition or adaptation. In some embodiments, the decryption key may be sent directly to the recognition server that has received the encrypted speech recognition input data for recognition. Alternatively, in embodiments where the recognition server generates the encryption/decryption key pair to encrypt the speech recognition input data, the decryption key subsequently used to decrypt the received encrypted speech recognition input data may be accessed by the recognition server without having to request the decryption key from the client computer.

After obtaining access to the appropriate decryption key, the process proceeds to act 212 where the encrypted speech recognition input data is decrypted using the decryption key. By decrypting the encrypted speech recognition input data only on a particular recognition server, access to the unencrypted speech recognition input data is limited to users with access to that particular server. Furthermore, in accordance with some embodiments, access is provided only during a recognition session, after which the unencrypted speech recognition input data is discarded, as discussed in more detail below.

After the encrypted speech recognition input data has been decrypted, the process proceeds to act 214, where the decrypted speech recognition input data is used to perform a task. In some embodiments, the task may be a speech recognition operation on the decrypted speech recognition input data. In other embodiments, the task may be adaptation of a speech recognition model using the decrypted speech information, where the decrypted speech information may include what the recognition engine misrecognized and/or an edited speech recognition result edited by a user of a client computer. In yet other embodiments, the task may be model building in which a speech recognition model (e.g., an acoustic or language model) is created using speech recognition input data from a plurality of speakers.

As discussed above, in some embodiments, speech recognition models used by server side recognition servers may also be encrypted. In such embodiments, one or more additional decryption keys for the appropriate speech recognition models used to perform speech recognition on decrypted speech recognition input data or that are adapted using decrypted speech information may also be requested from client computer 110. Received decryption keys for the encrypted speech recognition model(s) may be used to decrypt the speech recognition models prior to speech recognition by recognition server 160, adaptation of speech recognition model(s) by adaptation server 170, or any other suitable task (e.g., model building), as discussed in further detail below.

In embodiments where speech recognition is the task to be performed, once recognition server 160 has access to the decrypted speech recognition input data and appropriate models, recognition engine 162 may process the decrypted speech recognition input data to produce a speech recognition result. Speech recognition by recognition engine 162 may be performed in any suitable way, as the techniques described herein are not limited by the particular manner in which decrypted speech recognition input data is processed to produce a speech recognition result. Prior to transferring the speech recognition result to a client computer 110, the speech recognition result may be encrypted, as discussed in further detail below.

After the server side computer(s) 150 performs a task (e.g., speech recognition) on the decrypted data, the process proceeds to act 216, where the decrypted speech recognition input data used to generate the speech recognition result and the decryption key used to decrypt the encrypted speech recognition input data are discarded. In some embodiments, decrypted information including, but not limited to, decrypted speech recognition input data and decryption key(s) may be discarded in response to producing a speech recognition result and providing the result to a client computer. Alternatively, at least some decrypted information may be temporarily retained by the recognition server 160 until the end of a dictation session, after which the decrypted information may be discarded, as the techniques described herein are not limited by when the decrypted information is discarded. The process then proceeds to act 218, where the encrypted speech recognition input data received from client computer 110, and stored by encrypted storage 180, is retained on server side computer(s) 150. Because the speech recognition input data is stored in its encrypted form, unauthorized access to the data is safeguarded against.

Figure 3:
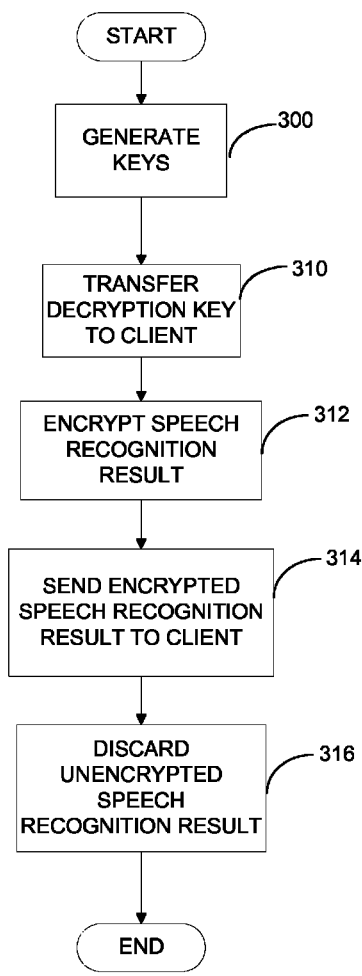
FIG. 3 is a flow chart of an exemplary process for encrypting a speech recognition result provided by a recognition server in accordance with some embodiments of the invention.

FIG. 3 is a flowchart of an illustrative process for encrypting a speech recognition result produced by a recognition server in accordance with some embodiments. In act 300, a pair of keys including a decryption key and a corresponding encryption key are generated. As discussed above, recognition server 160 may include a recognition key manager 166 configured to generate and/or manage keys for encryption/decryption of speech recognition results. In some embodiments, recognition key manager 166 generates the pair of keys to use for encrypting/decrypting a speech recognition result. In embodiments where the key manager 166 generates the keys in act 300, the process proceeds to act 310, where the decryption key is transferred to the client computer 110. The decryption key may itself be encrypted (e.g., with an encryption key provided by client computer 110) prior to transferring the decryption key to the client computer. Alternatively, in some embodiments, the pair of keys for encrypting/decrypting a speech recognition result may be generated by client key manager 118 associated with client computer 110, and the encryption key may be provided to recognition server 160 via network 120, while the corresponding decryption key is maintained by client computer 110, thereby eliminating a possible security vulnerability associated with transferring decryption keys between clients and servers in a client/server speech recognition system.

After receiving an encryption key, the process proceeds to act 312, where processor(s) 164 associated with recognition server 160 use the encryption key (either generated locally or provided by client computer 110) to encrypt a speech recognition result provided by recognition engine 162. The encryption may be performed using any suitable encryption algorithm(s), which may be the same as or different from the algorithm(s) described above in connection with encrypted speech recognition input data transferred from client computer 110 to server side computer(s) 150. The process then proceeds to act 314, where the encrypted speech recognition result is sent to the client computer 110 (e.g., the client computer that issued the speech recognition request). In some embodiments, additional information may be included with the encrypted speech recognition result. For example identifying information may be included, and the identifying information may subsequently be used by the client computer to determine how to display the speech recognition result on the client computer. The additional information may also include, but is not limited to, information about the speaker, the input speech recognition input data, and where the speech recognition result is to be sent (e.g., an identity of the client computer that issued the request).

After the encrypted speech recognition result has been sent to the client computer 110, the process proceeds to act 316, where the unencrypted speech recognition result stored on the server side of the client/server speech recognition system is discarded. By discarding the unencrypted speech recognition result, only encrypted information is retained on the server side portion of the client/server speech recognition system, thereby limiting the attack surface of sensitive information stored thereon. Additionally, in some embodiments, the speech recognition result produced by the recognition server 160 may be encrypted and maintained on the server side computer(s) 150.

In embodiments where the encryption key used to encrypt the speech recognition result is generated by the recognition key manager 166, the corresponding decryption key also generated by the recognition key manager 166 may be sent to the client computer 110, rather than being stored on the server side computer(s) 150. In some embodiments, the decryption key may be encrypted to secure against interception. In other embodiments where the client computer 110 generates the encryption and decryption keys for the speech recognition result, client computer 110 stores the decryption key after generation by client key manager 116 and it need not be transferred to the server side computer(s) 150. This reduces the possibility of an attacker monitoring network communications and intercepting the key.

Regardless of whether a decryption key for the encrypted speech recognition result is sent to the client computer, any decrypted information (e.g., decryption keys, decrypted speech recognition results, etc.) may be discarded by recognition server 160 after producing a speech recognition result, such that only encrypted data is stored on the server side computer(s) 150 after a dictation session has ended. For example, if a decryption key for an encrypted speech recognition model was provided by client computer 110 to decrypt the speech recognition model for use in speech recognition, this decryption key may also be discarded in act 316 along with the unencrypted speech recognition result.

Figure 4:
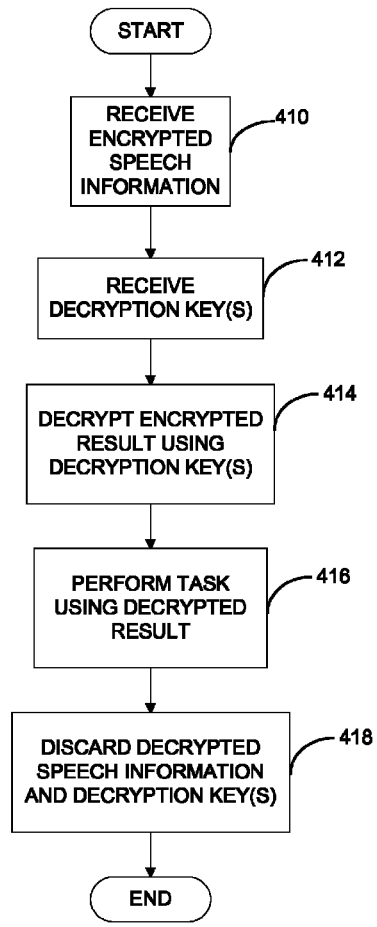
FIG. 4 is a flow chart of an exemplary process for performing a server side task in response to receiving encrypted speech recognition information from a client computer in accordance with some embodiments of the invention.

FIG. 4 is a flowchart of an illustrative process for performing a task (e.g., speech recognition model adaptation, model building, etc.) based, at least in part, on encrypted speech recognition information received from a client computer in accordance with some embodiments of the invention. In act 410, encrypted speech recognition information is received from a client computer. As discussed above, a recognition server may produce a speech recognition result based on encrypted speech recognition input data provided to server side computer(s) 150 and the speech recognition result may be encrypted and sent back to a client computer for display and potential modification by a user of the client computer. The user of the client computer may make one or more edits to the speech recognition result received from the server side computer(s) 150 to correct one or more misrecognitions introduced by the speech recognition process. The modified speech recognition result may then be encrypted by the client computer and sent to the server side computer(s) 150 as the encrypted speech recognition information to facilitate adaptation of a speech recognition model or to perform some other task (e.g., model building). In some embodiments, information describing the one or more edits may be sent to the server side computer(s) 150 as the encrypted speech recognition information.

After receiving the encrypted speech recognition information, the process proceeds to act 412, where one or more decryption keys are received from client computer 110. If the task to be performed is speech recognition model adaptation, in some embodiments, the one or more decryption keys may be provided directly to adaptation server 170 via network interface 178. The process then proceeds to act 414, where the received decryption key(s) are used to decrypt the encrypted speech recognition information received from the client computer 110. In some embodiments, the encrypted speech recognition information may be stored in encrypted storage 180 prior to being provided to adaptation server 170. In other embodiments, the encrypted speech recognition information may be provided directly to adaptation server 170 without being stored in encrypted storage 180.

Processor(s) 172 associated with adaptation server 170 may be programmed to use at least one of the received decryption keys to decrypt the encrypted speech recognition information received from client computer 110. In embodiments that employ encrypted speech recognition models, at least one of the decrypted keys may also be used to decrypt an encrypted speech recognition model to be adapted. After decrypting the encrypted speech recognition information and/or the encrypted speech recognition model(s), adaptation engine 174 may be used to adapt the unencrypted speech recognition model(s) based, at least in part, on the decrypted speech recognition information received from client computer 110.

Adaptation of a speech recognition model may be performed in any suitable manner. In some embodiments, prior to sending a speech recognition result generated by recognition server 160 to client computer 110, the speech recognition result is encrypted and stored by server side computer(s) 150. Alternatively, the encrypted speech recognition result may be provided to client computer 110 without storing the encrypted speech recognition result on the server side computer(s) 150. To adapt a speech recognition model, adaptation server 170 may use an encrypted speech recognition result received from client computer 110 that includes one or more user edits to the original speech recognition result. If the original speech recognition result was stored on the server-side computer(s) 150 in encrypted form, the original speech recognition result may be accessed and decrypted for use in the adaptation process. Otherwise, in addition to providing the encrypted modified speech recognition result, the client computer may also provide the encrypted original speech recognition result to the adaptation server 170 to adapt a speech recognition model. Having access to the original speech recognition result, the modified speech recognition result, and the speech recognition model, the adaptation server 170 may then adapt the speech recognition model in any suitable way including, but not limited to, adaptation processes that are known to those of skill in the art.

After performing adaptation, the process proceeds to act 418, where the decrypted speech recognition information used for adaptation and the decryption key(s) received from client computer are discarded. The adapted unencrypted speech recognition model(s) may also be re-encrypted using an encryption key generated by adaptation key manager 176 or provided by client key manager 116. Although the task described above in accordance with FIG. 4 is adaptation of a speech recognition model, it should be appreciated that the key management and encryption techniques described herein can be used in client/server speech recognition systems to protect sensitive speech recognition input data, speech recognition results, and speech recognition models in any suitable way.

Figure 5:
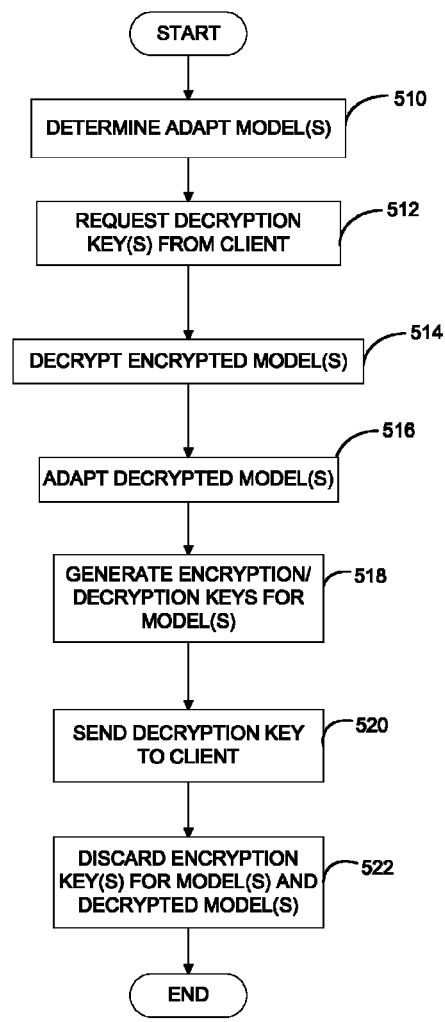
FIG. 5 is a flow chart of an exemplary process for performing adaptation of a speech recognition model in accordance with some embodiments of the invention.

FIG. 5 is a flowchart of an illustrative process for performing model adaptation in accordance with some embodiments of the invention, wherein the process is initiated by server side computer(s) 150. In act 510, it is determined that one or more speech recognition models should be adapted. This determination may be made in any suitable way including, but not limited to, determining that a model should be adapted for each new dictation session where a user edits a speech recognition result. Alternatively, it may be determined to adapt a speech recognition model periodically or in response to a user request to perform adaptation.

After determining that adaptation is desired, the process proceeds to act 512, where one or more decryption keys are requested from a client computer. As discussed above, some speech recognition models may be encrypted to provide additional security regarding sensitive information that may be determined from the models. Accordingly, in embodiments that use encrypted speech recognition models, adaptation server 170 may issue a request to client computer 110 to provide a decryption key to decrypt an encrypted speech recognition model prior to performing adaptation. The process then proceeds to act 514, where the encrypted models are decrypted using the decryption key(s) provided to the adaptation server 170 from the client computer 110 in response to the request.

After decrypting the encrypted model(s), the process proceeds to act 516, where the decrypted models are adapted based, at least in part, on encrypted speech recognition information (e.g., an encrypted modified speech recognition result) received from client computer 110. As discussed in further detail below, with regard to FIG. 6, in some embodiments, a speech recognition result generated by recognition server 160 is transferred to client computer 110 and the speech recognition result is displayed by client computer 110. A user of client computer 110 may then edit the speech recognition result to correct any misrecognition errors in the original speech recognition result, and the modified speech recognition result including the edit(s) may be provided to adaptation server 170 to adapt the speech recognition model that was used to generate the original speech recognition result prior to modification. Although a modified speech recognition result received from client computer 110 may be used to adapt a speech recognition model in accordance with some embodiments, other information including, but not limited to, information stored by storage side computer(s) 150 (e.g., an encrypted version of the original speech recognition result) may also be used, at least in part, to adapt speech recognition models in accordance with the techniques described herein.

After adapting the speech recognition model(s), the process proceeds to act 518, where encryption and/or decryption keys are generated to re-encrypt the adapted speech recognition model(s). In some embodiments, a new encryption/decryption key pair may be generated by adaptation key manager 176 and processor(s) 172 may be configured to use the generated encryption key to encrypt the adapted speech recognition models. In such embodiments, the process proceeds to act 520, where the decryption key generated by adaptation key manager 176 is sent to client computer 110. In some embodiments, generation of an encryption/decryption key pair for speech recognition models used by server side recognition servers may be performed by a client computer rather than a server computer. In such embodiments, client computer 110 may provide an encryption key to adaptation server to encrypt the adapted speech recognition model following adaptation, while retaining the corresponding decryption key on the client computer 110. In response to a new request for adaptation, the client computer 110 may provide the retained decryption key to the adaptation server to enable the decryption of the encrypted speech recognition model stored by the server side computer(s) 150 to be adapted.

The process proceeds to act 522, where the encryption and/or decryption keys used during the model adaptation process are discarded, while the encrypted speech recognition model(s) are retained (e.g., in encrypted storage 180) for further use by recognition server 160. Additionally, any decrypted models or speech recognition results may be discarded, such that only encrypted information is stored on server side computer(s) 150 after the adaptation process has been completed.

Figure 6:
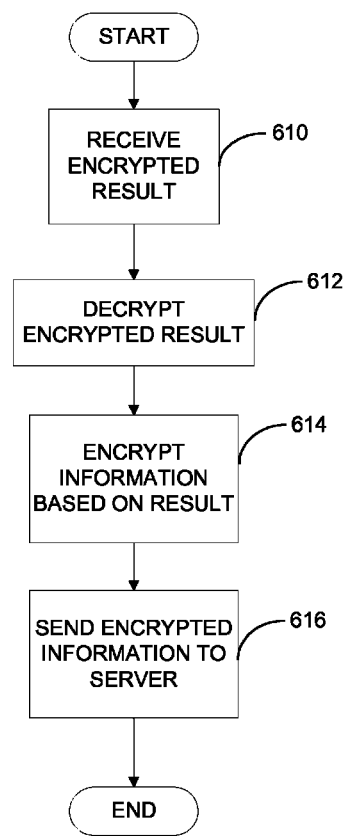
FIG. 6 is flow chart of an exemplary process for providing encrypted information based on a speech recognition result to a server in accordance with some embodiments of the invention.

FIG. 6 illustrates an exemplary process for providing encrypted speech recognition information to a server side portion of a client/server speech recognition system in accordance with some embodiments of the invention. In act 610, an encrypted speech recognition result is received by a client computer in the client/server speech recognition system. For example, the encrypted speech recognition result may be received in response to sending encrypted speech recognition input data from the client computer 110 to the server side computer(s) 150 for speech recognition. The process then proceeds to act 612, where the encrypted speech recognition result is decrypted using a decryption key. In some embodiments where the encryption and decryption keys are generated at the server side, the decryption key used to decrypt the speech recognition result may have been sent to the client computer from the recognition server. In other embodiments where a client computer generates the encryption/decryption keys for encrypting a speech recognition result, the client computer 110 may have sent the encryption key to the recognition server to encrypt the speech recognition result, but may have retained the decryption key in local storage associated with the client computer 110. Regardless of whether the decryption key was stored locally on client computer 110 or received from server side computer(s) 150, the decryption key may be used in act 612 to decrypt the encrypted speech recognition result.

Once decrypted, the speech recognition result may be displayed by client computer 110 to enable a user of the client computer to determine whether the speech recognition result is correct or whether the speech recognition result includes one or more recognition errors. The speech recognition result may be displayed in any suitable way to facilitate the editing of the speech recognition result by the user. In some embodiments, an application executing on the client computer 110 may use an identifier associated with the encrypted speech recognition result received from the server side computer(s) 150 to determine where to display the speech recognition result, once decrypted, in a document displayed by the application. For example, if the application displays a free-form text box which a user can select to insert medical dictation information, the speech recognition input data received when the text box is selected may be associated with an identifier to indicate that the speech recognition input data is associated with the text box. The identifier may be sent with the encrypted speech recognition input data to server side computer(s) 150 for recognition, and the corresponding speech recognition result may be associated with the same identifier to enable the application executing on the client computer to determine that the speech recognition result should be displayed in the text box that was selected when the speech recognition input data was received.

If the speech recognition result received from the server side computer(s) 150 is not correct, the user of the client computer may make one or more edits to the speech recognition result to provide an edited speech recognition result. As discussed above, the server side of a client/server speech recognition system may include speech recognition models that a recognition server uses to recognize speech recognition input data, and these models may be adapted based, at least in part, on edits made to a speech recognition result.

After one or more edits to the decrypted speech recognition result have been received by a client computer, the process proceeds to act 614, where the edited speech recognition result is encrypted prior to being sent to the server side computer(s) 150 (e.g., for performing adaptation or model building, as discussed above). Encryption of the edited speech recognition result may be performed in any suitable way including, but not limited to, any of the encryption processes described above for encrypting speech recognition input data. For example, client key manager 118 may generate an encryption/decryption key pair and processor(s) 116 associated with client computer 110 may use the encryption key to encrypt the edited speech recognition result. Alternatively, an encryption key received from the server side may be used to encrypt the edited speech recognition result. The process then proceeds to act 616, where the encrypted edited speech recognition result is sent to the server side computer(s) 150.

In some embodiments, in addition to (or in lieu of) sending an encrypted edited speech recognition result to the server side computer(s) 150, other information describing the edits made to the speech recognition result may be encrypted and sent to the server side computer(s) 150, as embodiments are not limited by the particular information provided to server side computer(s) 150 to facilitate server side tasks such as model adaptation or model building.

In some embodiments, the encrypted information and/or speech recognition result may be provided to server side computer(s) 150 in response to a request from the server sided computer(s) 150 to do so. Alternatively, a user of client computer 110 may initiate the process of sending this information to server side computer(s) 150, as the techniques described herein are not limited by the particular manner in which the process for providing the information is initiated.

Figure 7:
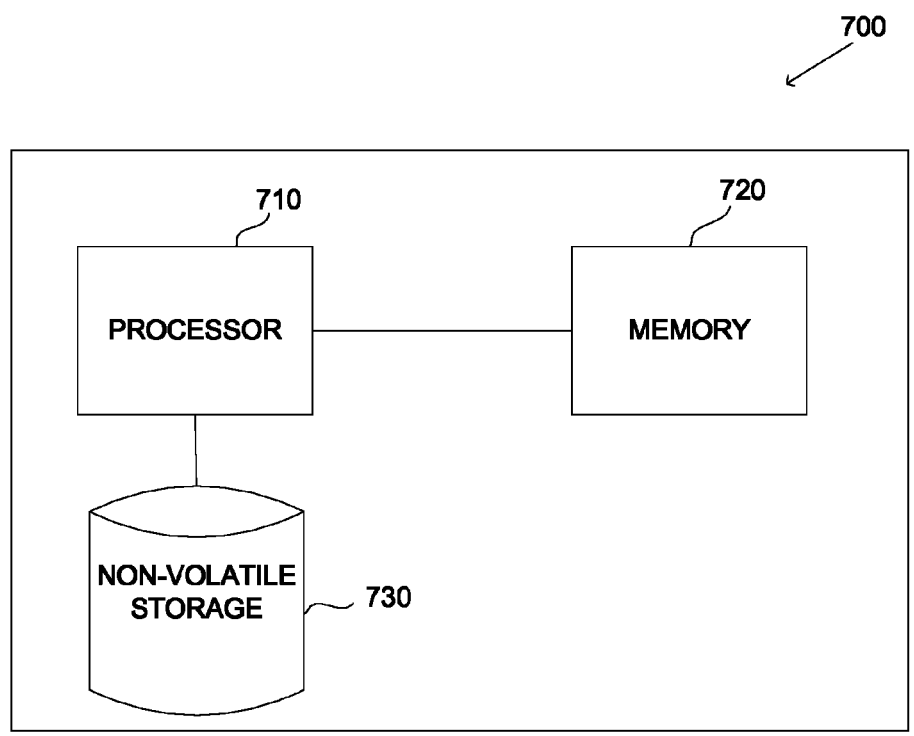
FIG. 7 is an exemplary computer system on which some embodiments of the invention may be implemented.

An illustrative implementation of a computer system 700 that may be used in connection with any of the embodiments of the invention described herein is shown in FIG. 7. The computer system 700 may include one or more processors 710 and one or more computer-readable tangible non-transitory storage media (e.g., memory 720, one or more non-volatile storage media 730, or any other suitable storage device). The processor 710 may control writing data to and reading data from the memory 720 and the non-volatile storage device 730 in any suitable manner, as the aspects of the present invention described herein are not limited in this respect. To perform any of the functionality described herein, the processor 710 may execute one or more instructions stored in one or more computer-readable storage media (e.g., the memory 720), which may serve as tangible non-transitory computer-readable storage media storing instructions for execution by the processor 710.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a USB drive, a flash memory, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method performed by at least one server computer in a client-server architecture including the at least one server computer and a client computer, the method comprising:
   accessing, by the at least one server computer, encrypted medical dictation information stored on at least one storage device;
   decrypting, by the at least one server computer, using a first decryption key, the encrypted medical dictation information to produce decrypted medical dictation information;
   performing, by the at least one server computer, speech recognition on the decrypted medical dictation information to produce an unencrypted speech recognition result;
   encrypting, by the at least one server computer, the unencrypted speech recognition result with an encryption key to produce an encrypted speech recognition result;
   sending the encrypted speech recognition result from the at least one server computer to the client computer; and
   discarding, by the at least one server computer, the first decryption key, the decrypted medical dictation information, and the unencrypted speech recognition result in response to sending the encrypted speech recognition result to the client computer.

2. The method of claim 1, further comprising receiving, by the at least one server computer, the encryption key from the client computer.

3. The method of claim 1, further comprising:
   generating, by the at least one server computer, a pair of keys including the encryption key and a second decryption key; and
   sending the second decryption key from the at least one server computer to the client computer.

4. The method of claim 1, further comprising:
   generating, by the at least one server computer, a pair of keys including the encryption key and a second decryption key;
   receiving, by the at least one server computer, the first decryption key from the client computer in encrypted form; and
   decrypting, by the at least one server computer, the first decryption key using the second decryption key prior to decrypting the encrypted medical dictation information with the first decryption key.

5. The method of claim 1, further comprising:
   associating, by the at least one server computer, the encrypted speech recognition result with an identifier; and
   sending the identifier from the at least one server computer to the client computer.

6. A server system in a client-server architecture including the server system and a client computer, the server system comprising:
   at least one speech recognition engine; and
   at least one processor programmed to:
      access encrypted medical dictation information from at least one storage device;
      decrypt the encrypted medical dictation information using a first decryption key to produce decrypted medical dictation information;
      instruct the at least one speech engine to perform speech recognition on the decrypted medical dictation information, thereby producing an unencrypted speech recognition result;
      encrypt the unencrypted speech recognition result with an encryption key to produce an encrypted speech recognition result;
      send the encrypted speech recognition result to the client computer; and
      discard the first decryption key, the decrypted medical dictation information, and the unencrypted speech recognition result in response to sending the encrypted speech recognition result to the client computer.

7. The server system of claim 6, wherein instructing the at least one speech engine to perform speech recognition on the decrypted medical dictation information comprises providing the decrypted medical dictation information to the at least one speech recognition engine.

8. The server system of claim 6, wherein the server system includes the at least one storage device.

9. The server system of claim 6, wherein the encryption key is received by the server system from the client computer.

10. The server system of claim 6, wherein the at least one processor is further programmed to:
    generate a pair of keys including the encryption key and a second decryption key; and
    send the second decryption key to the client computer.

11. The server system of claim 6, wherein the at least one processor is further programmed to:
    generate a pair of keys including the encryption key and a second decryption key;
    receive the first decryption key from the client computer in encrypted form; and
    decrypt the first decryption key using the second decryption key prior to decrypting the encrypted medical dictation information with the first decryption key.

12. The server system of claim 6, wherein the at least one processor is further programmed to:
   associate the encrypted speech recognition result with an identifier; and
   send the identifier to the client computer.

13. An adaptation server in a client-server architecture including the adaptation server and a client computer, wherein the adaptation server is configured to adapt an encrypted speech recognition model, the adaptation server comprising:
   at least one processor programmed to:
      access an encrypted speech recognition result and encrypted medical dictation information from at least one storage device on which the encrypted speech recognition result and the encrypted medical dictation information are stored;
      receive, from the client computer a first decryption key and a second decryption key;
      decrypt the encrypted speech recognition result using the first decryption key to produce a decrypted speech recognition result;
      decrypt the encrypted medical dictation information using the second decryption key to produce decrypted medical dictation information;
      adapt the encrypted speech recognition model based, at least in part, on the decrypted speech recognition result and the decrypted medical dictation information; and
      discard the first decryption key, the second decryption key, the decrypted speech recognition result, and the decrypted medical dictation information.

14. The adaptation server of claim 13, wherein receiving the first decryption key and the second decryption key comprises receiving a single key as the first decryption key and the second description key.

15. The adaptation server of claim 13, wherein the at least one processor is further programmed to:
   receive a third decryption key from the client computer;
   use the third decryption key to decrypt the encrypted speech recognition model prior to the adapting;
   re-encrypt the adapted speech recognition model following the adapting; and
   discard the third decryption key.

16. The adaptation server of claim 13, wherein the at least one processor is further programmed to:
   issue a request to the client computer; and
   wherein the accessing the encrypted speech recognition result comprises accessing the encrypted speech recognition result in response to issuing the request.

17. The adaptation server of claim 13, wherein the encrypted speech recognition result includes at least one edit made by a user of the client computer.

18. The adaptation server of claim 13, wherein the at least one processor is further programmed to:
   generate at least one pair of keys including an encryption key and a third decryption key;
   decrypt the first decryption key and/or the second decryption key using the third decryption key; and
   discard the third decryption key after using the third decryption key in decrypting the first decryption key and/or the second decryption key.

19. The adaptation server of claim 13, wherein the encrypted speech recognition model is a language model.

20. The adaptation server of claim 13, wherein the encrypted speech recognition model is an acoustic model.

* * * * *